(12) United States Patent
Mahmud et al.

(10) Patent No.: US 11,775,720 B2
(45) Date of Patent: Oct. 3, 2023

(54) INTEGRATED CIRCUIT DEVELOPMENT USING MACHINE LEARNING-BASED PREDICTION OF POWER, PERFORMANCE, AND AREA

(71) Applicant: International Business Machines Corporation, Armonk, NY (US)

(72) Inventors: Tuhin Mahmud, Austin, TX (US); Saiful Islam, Austin, TX (US); Abraham Mathews, Austin, TX (US); Geoffrey Wang, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 209 days.

(21) Appl. No.: 17/366,340

(22) Filed: Jul. 2, 2021

(65) Prior Publication Data
US 2023/0004701 A1    Jan. 5, 2023

(51) Int. Cl.
*G06N 20/20*  (2019.01)
*G06F 30/367*  (2020.01)

(52) U.S. Cl.
CPC ........... *G06F 30/367* (2020.01); *G06N 20/20* (2019.01)

(58) Field of Classification Search
CPC ........ G06F 30/367; G06F 30/27; G06N 20/20
See application file for complete search history.

(56) References Cited

U.S. PATENT DOCUMENTS

| | | | |
|---|---|---|---|
| 6,751,519 B1 | 6/2004 | Satya et al. | |
| 7,386,739 B2 | 6/2008 | Ghiasi et al. | |
| 8,190,939 B2 | 5/2012 | Fields, Jr. et al. | |
| 9,792,397 B1 | 10/2017 | Nagaraja | |
| 10,621,302 B2 | 4/2020 | Sha et al. | |
| 10,706,205 B2 | 7/2020 | Shao et al. | |
| 10,817,634 B2 | 10/2020 | Oh | |
| 10,929,586 B2 | 2/2021 | Banna et al. | |
| 10,949,585 B1 | 3/2021 | Winefeld | |
| 2015/0317589 A1 | 11/2015 | Anderson et al. | |

(Continued)

FOREIGN PATENT DOCUMENTS

| | | |
|---|---|---|
| CN | 104991884 B | 12/2017 |
| CN | 104899385 B | 1/2018 |

(Continued)

OTHER PUBLICATIONS

Last et al. Predicting Memory Compiler Performance Outputs Using Feed-Forward Neural Networks Technical University of Munich, Germany, Mar. 2020 (Year: 2020).*

(Continued)

*Primary Examiner* — Rehana Perveen
*Assistant Examiner* — Cuong V Luu
(74) *Attorney, Agent, or Firm* — Samuel Waldbaum; Cantor Colburn LLP (57) ABSTRACT

Aspects of the invention include obtaining one or more feature values that define an architecture design of a memory array and implementing a machine learning model to obtain a predicted power, performance, and area (PPA) of the memory array based on the one or more features. The predicted PPA output by the machine leaning model is assessed based on predefined PPA goals. A design of an integrated circuit that includes the memory array is finalized and fabricated based on the predicted PPA meeting the predefined PPA goals.

20 Claims, 5 Drawing Sheets

(56) References Cited

U.S. PATENT DOCUMENTS

2016/0117436 A1    4/2016  Ng et al.
2022/0004900 A1*   1/2022  Salahuddin ............. G06F 30/27
2022/0027536 A1*   1/2022  Dutta ..................... G06N 20/00

FOREIGN PATENT DOCUMENTS

| CN | 109726466 B    | 5/2020  |
| CN | 111178518 A    | 5/2020  |
| CN | 111985150 A    | 11/2020 |
| KR | 1020200030428 A | 3/2020 |
| WO | 2020112023 A1  | 6/2020  |

OTHER PUBLICATIONS

Zennaro et al. A Machine Learning Approach for Area Prediction of Hardware Designs from Abstract Specification 21st Euronicro Conference on Digital System Deisgn 2018 (Year: 2018).*

* cited by examiner

INTEGRATED CIRCUIT DEVELOPMENT USING MACHINE LEARNING-BASED PREDICTION OF POWER, PERFORMANCE, AND AREA

BACKGROUND

The present invention generally relates to integrated circuit development, and more specifically, to integrated circuit development using machine learning-based prediction of power, performance, and area (PPA).

The development of an integrated circuit (i.e., chip) involves several stages from design through fabrication. Many aspects of the development are performed iteratively to ensure that the chip that is ultimately manufactured meets all design requirements. Defining the chip architecture is one of the earliest phases of integrated circuit development. The power (i.e., power requirement), performance (e.g., timing), and area (i.e., space needed) for the resulting chip, which is the metric by which integrated circuits are commonly evaluated, is largely a consequence of the chip architecture.

SUMMARY

Embodiments of the present invention are directed to integrated circuit development using machine learning-based prediction of PPA. A non-limiting example computer-implemented method includes obtaining one or more feature values that define an architecture design of a memory array and implementing a machine learning model to obtain a predicted power, performance, and area (PPA) of the memory array based on the one or more features. The predicted PPA output by the machine leaning model is assessed based on predefined PPA goals, wherein a design of an integrated circuit that includes the memory array is finalized and fabricated based on the predicted PPA meeting the predefined PPA goals.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

As previously noted, PPA is a metric commonly used to evaluate integrated circuits, also referred to as chips. While optimizations can be performed in later phases of integrated circuit development to ensure that timing and other requirements are met, PPA is largely a result of the architecture definition, which is generated early in the development phase. In this regard, memory arrays may be a proxy for the full integrated circuit. That is, memory arrays generally make up a significant portion of an integrated circuit and, thus, are understood to be a determinative factor in the PPA of the chip.

Memory array architectures are defined by the needs of the parent logic units that use them. Design features such as the number of read and write ports, the number of entries and bits, and clock domain are selected based on those logic units. When a parent logic unit requests a memory array macro, a sizing is provided that gives an estimate of the PPA of the macro. This is used to get an early estimate of timing, floor planning, and power, which, in turn, help to determine chip frequency, die size, and thermal power of the chip. The estimate is actually a prediction of what the PPA of the memory array will be. The prediction of PPA can also be used to modify features of the memory array, as needed, to improve the PPA of the memory array and, ultimately, the chip.

A prior approach to predicting PPA of a memory array design involves manually analyzing PPA data from previously completed integrated circuit designs using spreadsheet calculations. The analysis provides an indication of which features have the greatest effect on PPA and, thus, informs tradeoffs made during the design of the memory array. However, because the analysis is manual, the number of features that can practically be considered is limited. This limitation can, in turn, limit the accuracy with which PPA can be predicted and, consequently, the optimization that can be achieved.

Embodiments of the invention relate to integrated circuit development using machine learning-based prediction of PPA. As previously noted, predicting the PPA based on architecture design of memory arrays to optimize the features of the memory arrays is specifically discussed based on the influence of memory array PPA on the PPA of the overall chip. However, the processes detailed herein may apply to predicting PPA of other components (e.g., logic units), as well. By replacing the manual data analysis with a machine learning model, more features can easily be considered. The machine learning-based model becomes more accurate as the number of features and the number of previous designs that are considered is increased.

Figure 1:
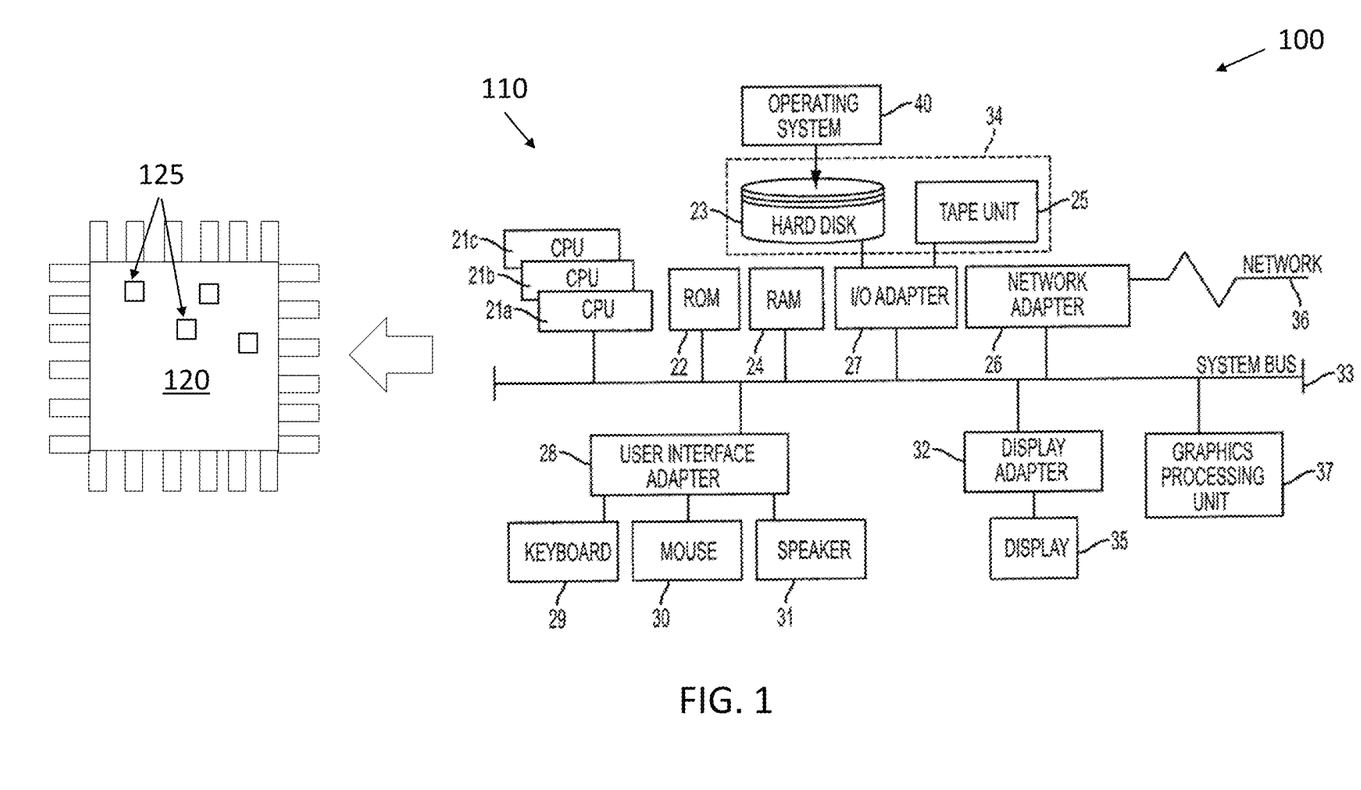
FIG. 1 is a block diagram of a system to perform the development of an integrated circuit using machine learning-based prediction of the PPA according to one or more embodiments of the invention.

FIG. 1 is a block diagram of a system 100 to perform the development of an integrated circuit 120 using machine learning-based prediction of the PPA according to one or more embodiments. Exemplary memory arrays 125 are indicated as being part of the integrated circuit 120. The system 100 includes a processing system 110 used to generate the design that is ultimately fabricated into the integrated circuit 120. The steps involved in the fabrication of the integrated circuit 120 are well-known and briefly described herein. Once the physical layout is finalized, based, in part, on selection of a via mesh specification among universally routable via mesh specifications developed according to embodiments of the invention, the finalized physical layout is provided to a foundry. Masks are generated for each layer of the integrated circuit based on the finalized physical layout. Then, the wafer is processed in the sequence of the mask order. The processing includes photolithography and etch. This is further discussed with reference to FIG. 5.

The processing system 110 has one or more central processing units (processors) 21a, 21b, 21c, etc. (collectively or generically referred to as processor(s) 21 and/or as processing device(s)). According to one or more embodiments of the present invention, each processor 21 can include a reduced instruction set computer (RISC) microprocessor. Processors 21 are coupled to system memory (e.g., random access memory (RAM) 24) and various other components via a system bus 33. Read only memory (ROM) 22 is coupled to system bus 33 and can include a basic input/output system (BIOS), which controls certain basic functions of processing system 110.

Further illustrated are an input/output (I/O) adapter 27 and a communications adapter 26 coupled to system bus 33. I/O adapter 27 can be a small computer system interface (SCSI) adapter that communicates with a hard disk 23 and/or a tape storage drive 25 or any other similar component. I/O adapter 27, hard disk 23, and tape storage device 25 are collectively referred to herein as mass storage 34. Operating system 40 for execution on processing system 110 can be stored in mass storage 34. The RAM 22, ROM 24, and mass storage 34 are examples of memory 19 of the processing system 110. A network adapter 26 interconnects system bus 33 with an outside network 36 enabling the processing system 110 to communicate with other such systems.

A display (e.g., a display monitor) 35 is connected to system bus 33 by display adaptor 32, which can include a graphics adapter to improve the performance of graphics intensive applications and a video controller. According to one or more embodiments of the present invention, adapters 26, 27, and/or 32 can be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 can be interconnected to system bus 33 via user interface adapter 28, which can include, for example, a Super I/O chip integrating multiple device adapters into a single integrated circuit.

According to one or more embodiments of the present invention, processing system 110 includes a graphics processing unit 37. Graphics processing unit 37 is a specialized electronic circuit designed to manipulate and alter memory to accelerate the creation of images in a frame buffer intended for output to a display. In general, graphics processing unit 37 is very efficient at manipulating computer graphics and image processing and has a highly parallel structure that makes it more effective than general-purpose CPUs for algorithms where processing of large blocks of data is done in parallel.

Thus, as configured herein, processing system 110 includes processing capability in the form of processors 21, storage capability including system memory (e.g., RAM 24), and mass storage 34, input means such as keyboard 29 and mouse 30, and output capability including speaker 31 and display 35. According to one or more embodiments of the present invention, a portion of system memory (e.g., RAM 24) and mass storage 34 collectively store an operating system such as the AIX® operating system from IBM Corporation to coordinate the functions of the various components shown in processing system 110.

Figure 2:
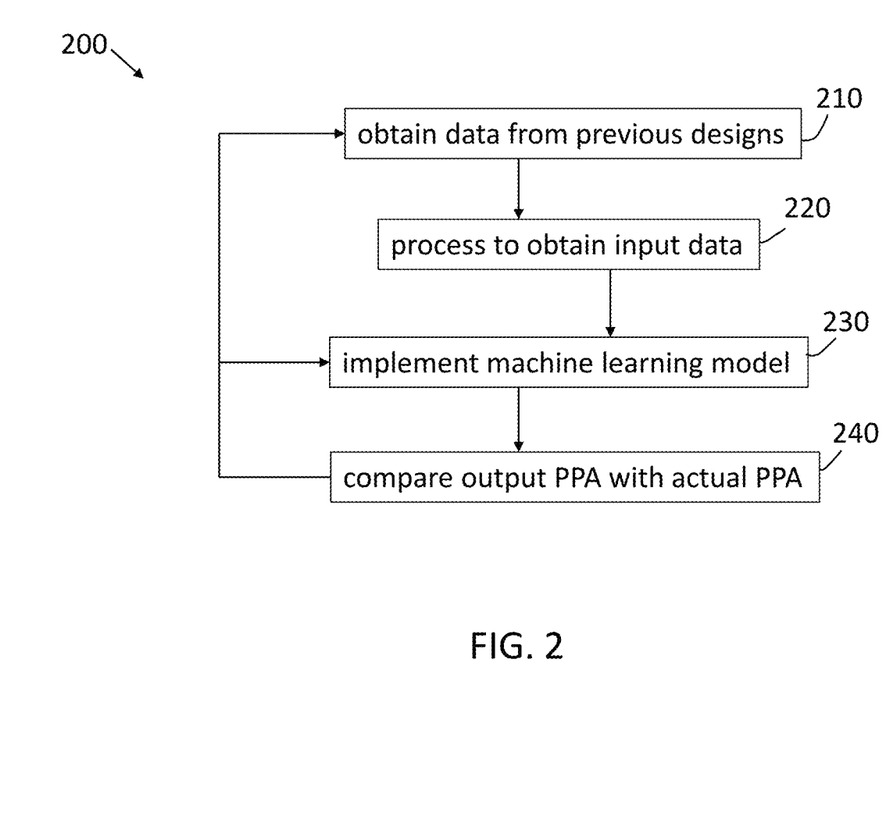
FIG. 2 is a process flow of a method of training a machine learning model to facilitate integrated circuit development using machine learning-based prediction of PPA according to one or more embodiments of the invention.

FIG. 2 is a process flow of a method 200 of training a machine learning model to facilitate integrated circuit development using machine learning-based prediction of PPA according to one or more embodiments of the invention. The training and implementation, which is discussed with reference to FIG. 4, may be technology specific. That is, a different machine learning model may be trained for 14 nanometer (nm) versus 7 nm, for example. Alternately, cross technology training may be used. For example, scaling may be used to implement a machine learning model that was trained using data from 14 nm technologies for prediction of PPA in 7 nm technologies. The terms 14 nm and 7 nm are used in the art to refer to different semiconductor fabrication process technologies.

At block 210, obtaining data from previous (completed) designs refers to obtaining stored data including features of memory arrays and the PPA corresponding with the feature values. The data mining may be performed using known Perl or Python-BASED tools, for example. As previously noted, the data may be technology specific. Thus, for the development of a 14 nm integrated circuit, only data from memory arrays used in other 14 nm chips may be mined at block 210.

At block 220, processing the data to obtain input data for machine learning may refer to weighting and formatting the data. As part of the processing at block 220, a correlation matrix may be used to initially narrow down the features of interest based on correlated features. A correlation matrix refers to a matrix of feature values and PPA components. That is, by examining the data from previous memory arrays, the features that most strongly correlated with the resultant PPA (e.g., differences in the values of these features caused proportional changes in power, performance, and/or area) may be identified. This is further discussed with reference to FIG. 3. Additionally, or alternately, as part of the processing at block 220, subject matter experts may be consulted to identify the features of greatest interest. In order to provide input to the machine learning, at block 230, syntax errors, omissions, and other formalities may also be addressed as part of the processing at block 220.

At block 230, implementing the machine learning model may refer to implementing any known machine learning approach. The implementation at block 230 is part of the training and uses input data (i.e., features) for which the PPA is known. Exemplary machine learning models include linear regression and different varieties of non-linear regression. An ensemble model may be implemented that includes multiple weighted models. The weighting accounts for the fact that different models may provide different accuracy levels in the PPA result based on different conditions. The output of the machine learning model may be an aggregation (e.g., average, mean) of the power, performance, and area values that are output by each model of the ensemble.

At block 240, comparing the output PPA of the machine learning model (implemented at block 230) with the actual PPA that resulted according to the historic data provides an indication of how closely the machine learning model (e.g., each model of an ensemble) predicted the power, performance, and area. As indicated in FIG. 2, this result is provided to update the machine learning model and may result in another training iteration beginning at block 210. For example, additional features may be added (to those from block 220) or weightings (at block 230) may be adjusted.

Figure 3:
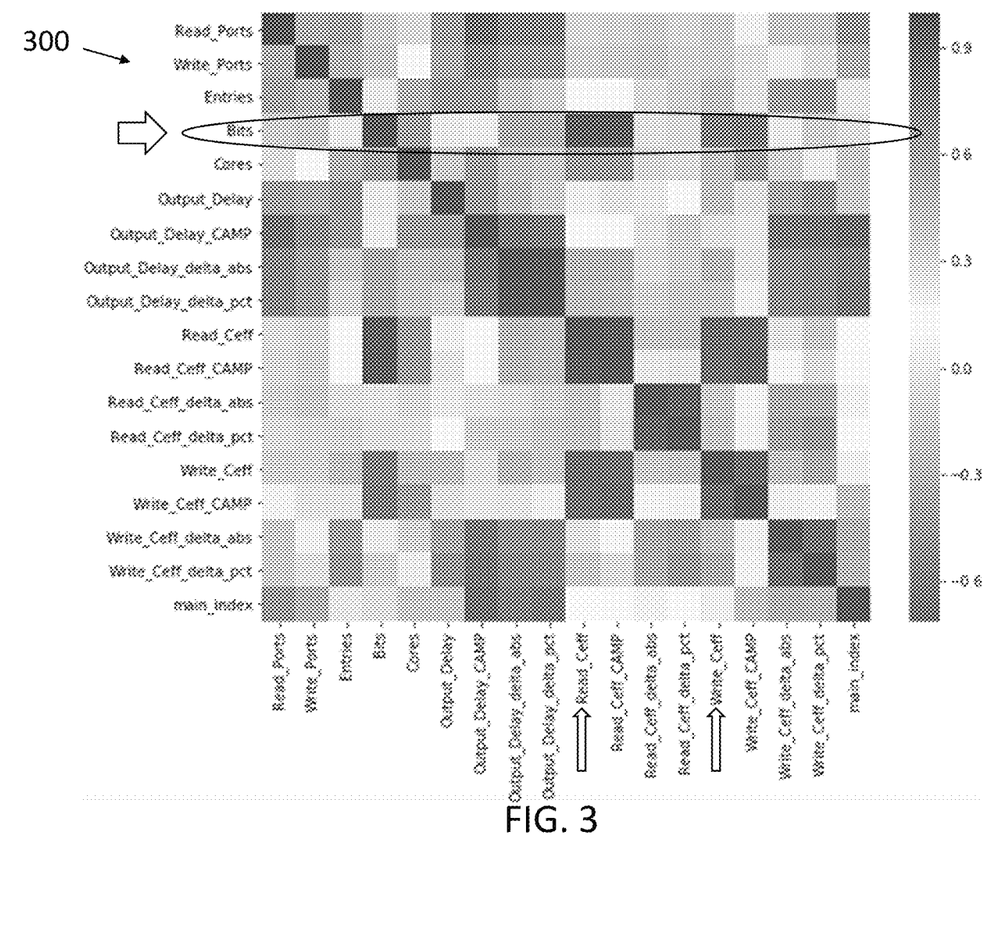
FIG. 3 shows an exemplary correlation matrix used to perform data analysis as part of the processing shown in FIG. 2.

FIG. 3 shows an exemplary correlation matrix 300 used to perform data analysis as part of the processing at block 220 in FIG. 2. The matrix 300 shows both features and components of PPA along perpendicular axes. Exemplary features include the entry count (Entires), the bit count (Bits), the number of read ports (Read_Ports), and the number of write ports (Write_Ports). Other features include repairability, types of clocks and voltages, output loads, read/write driver strengths, types of interconnect metal used for read/write drivers, and set/way capability. Exemplary components of the power value indicate a read power component (Read_Ceff) and a write power component (Write_Ceff). For example, the correlation matrix may indicate that the bit count (Bits) has a strong correlation with components that indicate power (Read_Ceff, Write_Ceff). Thus, the bit count may be a feature that is initially tested, via inclusion in the training data set, to determine if the bit count is a determinative feature (i.e., a feature whose value helps to predict power, performance, and/or area).

Figure 4:
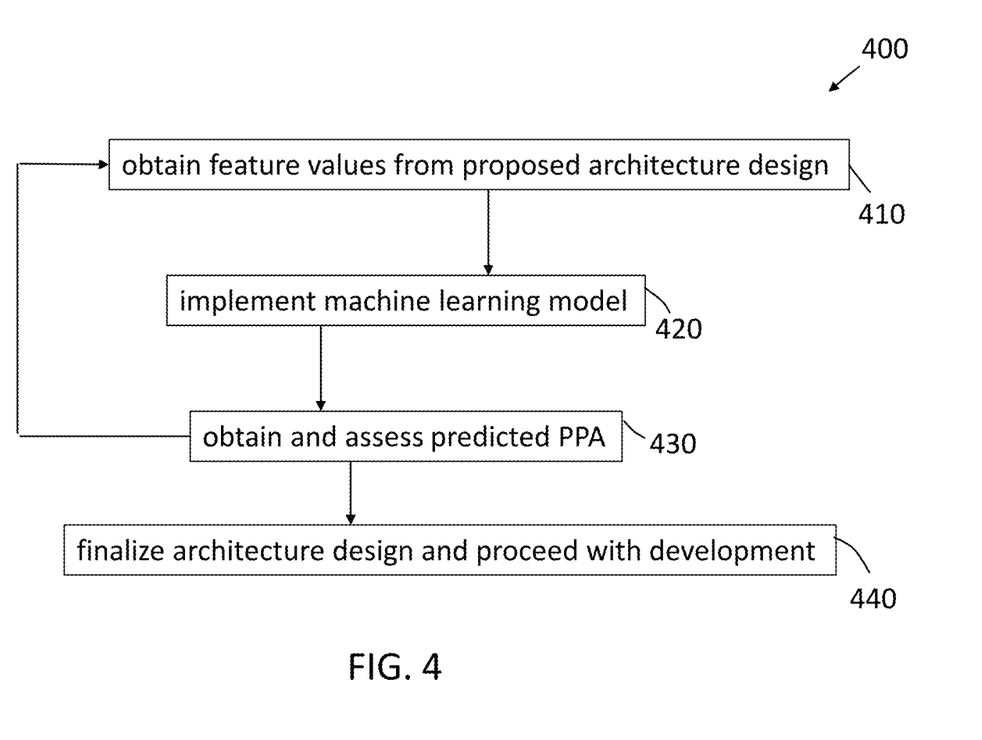
FIG. 4 is a process flow of a method of implementing a machine learning model for integrated circuit development using machine learning-based prediction of PPA according to one or more embodiments of the invention.

FIG. 4 is a process flow of a method 400 of implementing a machine learning model for integrated circuit development using machine learning-based prediction of PPA according to one or more embodiments of the invention. The processes shown in FIG. 4 are performed after the machine learning model is trained according to the processes shown in FIG. 2. At block 410, obtaining feature values from a proposed architecture design refers to obtaining, for example, the bit count, the entry count, the number of read ports, and the number of write ports for a memory array that is in the early design phase.

As discussed with reference to block 220 and FIG. 3, features may initially be selected for input in the training of the machine learning model based on their correlation with PPA in data collected from previous memory arrays 125. Implementation of the machine learning, at block 230, may then indicate which of these correlated features are determinative features. For example, while the bit count may correlate with components of power (e.g., Read_Ceff, Write_ Ceff), the trained machine learning model, which is trained at block 230, indicates whether a change in bit count results in a change in predicted power (i.e., this feature is determinative of the power, performance, and/or area prediction). Identification of determinative features may improve the accuracy of the prediction of PPA by the machine learning model by indicating which feature values should be obtained at block 410 (FIG. 4). As previously noted, by using machine learning rather than the prior manual approach, the identification of determinative features by testing a large number of potential (e.g., correlated) features is made more feasible.

At block 420, implementing the machine learning model may refer to implementing a machine learning model that was trained in a technology specific or cross technology manner, as previously discussed. At block 430, obtaining and assessing the predicted PPA may involve aggregating power, performance, and area values predicted by each model of an ensemble, for example. Assessment of the PPA is based on design restrictions and goals. For a given technology, the designer may establish these restrictions and goals (i.e., PPA goals) used in assessing PPA. The result of this assessment may be another iteration of the method 400. That is, if the predicted PPA is deemed to be insufficient (e.g., power is too high, delay is too long, or the area is too large) then one or more features that make up the architecture model may be modified.

The processes from block 410 to block 430 may then be repeated to assess the change in predicted PPA based on the modification to the design or certain architectural features. The assessment at block 430 may consider the predicted PPA for different memory arrays or additional components, as well. If, based on the assessment of predicted PPA, the proposed architecture design that is associated with the features that are input at block 410 is deemed sufficient, then the processes at block 440 are performed. The processes at block 440 represent all the additional phases in the design and fabrication to obtain the integrated circuit 120.

Figure 5:
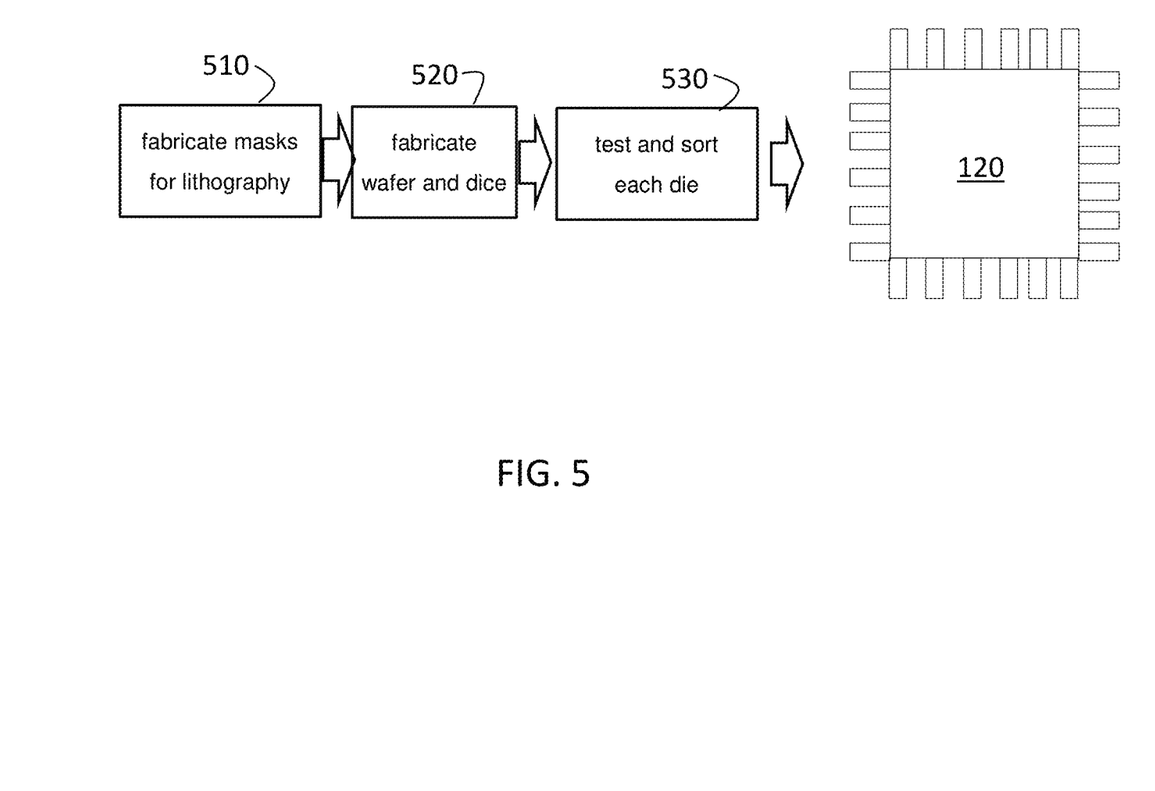
FIG. 5 is a process flow of a method of fabricating the integrated circuit according to exemplary embodiments of the invention.

FIG. 5 is a process flow of a method of fabricating the integrated circuit according to exemplary embodiments of the invention. Once the physical design data is obtained, based, in part, on the processes discussed with reference to FIGS. 2 and 4, the integrated circuit 120 can be fabricated according to known processes that are generally described with reference to FIG. 5. Generally, a wafer with multiple copies of the final design is fabricated and cut (i.e., diced) such that each die is one copy of the integrated circuit 120. At block 510, the processes include fabricating masks for lithography based on the finalized physical layout. At block 520, fabricating the wafer includes using the masks to perform photolithography and etching. Once the wafer is diced, testing and sorting each die is performed, at block 530, to filter out any faulty die.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   obtaining, using a processor, values that define an architecture design of a memory array, the feature values comprising a bit count, an entry count, a number of read ports, and a number of write ports for the memory array;
   building a correlation matrix comprising the feature values and a plurality of power, performance, and area (PPA) components from prior memory arrays;
   identifying, using the correlation matrix, one or more features of the feature values that most strongly correlated with the PPA components;
   training a machine learning model to obtain a predicted PPA of the memory array on the identified one or more features; and
   assessing the predicted PPA output by the machine learning model based on predefined PPA goals, wherein a design of an integrated circuit that includes the memory array is finalized and fabricated based on the predicted PPA meeting the predefined PPA goals.

2. The computer-implemented method according to claim 1, further comprising training the machine learning model using data from previous architecture designs of memory arrays with known PPA values.

3. The computer-implemented method according to claim 2, wherein the training the machine learning model further comprises identifying correlated features based on the data from previous architecture designs, each of the correlated features exhibiting a correlation between a value of the correlated feature and the known PPA value.

4. The computer-implemented method according to claim 2, wherein the training the machine learning model includes comparing a predicted PPA value, obtained by implementing the machine learning model, for each of the previous architecture designs of memory arrays with a corresponding one of the known PPA values.

5. The computer-implemented method according to claim 4, wherein the training the machine learning model includes identifying determinative features, the determinative features being features among the data from previous architecture designs that are given highest weighting by the machine learning model.

6. The computer-implemented method according to claim 1, wherein obtaining the predicted PPA of the memory array includes aggregating a PPA prediction from each model of an ensemble of models that make up the machine learning model.

7. The computer-implemented method according to claim 1, wherein the machine learning model is a linear or nonlinear model.

8. A system comprising:
a memory having computer readable instructions; and
one or more processors for executing the computer readable instructions, the computer readable instructions controlling the one or more processors to perform operations comprising:
obtaining feature values that define an architecture design of a memory array, the feature values comprising a bit count, an entry count, a number of read ports, and a number of write ports for the memory array;
building a correlation matrix comprising the feature values and a plurality of power, performance, and area (PPA) components from prior memory arrays;
identifying, using the correlation matrix, one or more features of the feature values that most strongly correlated with the PPA components;
training a machine learning model to obtain a predicted PPA of the memory array on the identified one or more features; and
assessing the predicted PPA output by the machine learning model based on predefined PPA goals, wherein a design of an integrated circuit that includes the memory array is finalized and fabricated based on the predicted PPA meeting the predefined PPA goals.

9. The system according to claim 8, further comprising training the machine learning model using data from previous architecture designs of memory arrays with known PPA values.

10. The system according to claim 9, wherein the training the machine learning model further comprises identifying correlated features based on the data from previous architecture designs, each of the correlated features exhibiting a correlation between a value of the correlated feature and the known PPA value.

11. The system according to claim 9, wherein the training the machine learning model includes comparing a predicted PPA value, obtained by implementing the machine learning model, for each of the previous architecture designs of memory arrays with a corresponding one of the known PPA values.

12. The system according to claim 11, wherein the training the machine learning model includes identifying determinative features, the determinative features being features among the data from previous architecture designs that are given highest weighting by the machine learning model.

13. The system according to claim 8, wherein obtaining the predicted PPA of the memory array includes aggregating a PPA prediction from each model of an ensemble of models that make up the machine learning model.

14. The system according to claim 8, wherein the machine learning model is a linear or nonlinear model.

15. A computer program product comprising a computer readable storage medium having program instructions embodied therewith, the program instructions executable by a processor to cause the processor to perform operations comprising:
obtaining feature values that define an architecture design of a memory array, the feature values comprising a bit count, an entry count, a number of read ports, and a number of write ports for the memory array;
building a correlation matrix comprising the feature values and a plurality of power, performance, and area (PPA) components from prior memory arrays;
identifying, using the correlation matrix, one or more features of the feature values that most strongly correlated with the PPA components;
training a machine learning model to obtain a predicted PPA of the memory array on the identified one or more features; and
assessing the predicted PPA output by the machine learning model based on predefined PPA goals, wherein a design of an integrated circuit that includes the memory array is finalized and fabricated based on the predicted PPA meeting the predefined PPA goals.

16. The computer program product according to claim 15, further comprising training the machine learning model using data from previous architecture designs of memory arrays with known PPA values.

17. The computer program product according to claim 16, wherein the training the machine learning model further comprises identifying correlated features based on the data from previous architecture designs, each of the correlated features exhibiting a correlation between a value of the correlated feature and the known PPA value.

18. The computer program product according to claim 16, wherein the training the machine learning model includes comparing a predicted PPA value, obtained by implementing the machine learning model, for each of the previous architecture designs of memory arrays with a corresponding one of the known PPA values.

19. The computer program product according to claim 18, wherein the training the machine learning model includes identifying determinative features, the determinative features being features among the data from previous architecture designs that are given highest weighting by the machine learning model.

20. The computer program product according to claim 15, where obtaining the predicted PPA of the memory array includes aggregating a PPA prediction from each model of an ensemble of models that make up the machine learning model.

* * * * *